United States Patent
Wingfield et al.

(10) Patent No.: US 10,825,328 B2
(45) Date of Patent: Nov. 3, 2020

(54) APPARATUS FOR MANAGING A PLURALITY OF DEVICES IN A PORTABLE COMMUNICATION SYSTEM

(71) Applicant: MOTOROLA SOLUTIONS, INC, Chicago, IL (US)

(72) Inventors: William J. Wingfield, Plantation, FL (US); Antonio Faraone, Fort Lauderdale, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/640,919

(22) Filed: Jul. 3, 2017

(65) Prior Publication Data

US 2019/0005803 A1 Jan. 3, 2019

(51) Int. Cl.
*G08B 25/01* (2006.01)
*H04B 1/3827* (2015.01)
(Continued)

(52) U.S. Cl.
CPC .......... *G08B 25/016* (2013.01); *H04B 1/385* (2013.01); *H04B 5/0018* (2013.01);
(Continued)

(58) Field of Classification Search
CPC .................. G08B 25/016; H04B 1/385; H04B 2001/3855; H04W 4/008; A61B 5/0022; A61B 5/02055; A61B 5/04004; A61B 5/0492; A61B 5/6805; A61B 2503/10; A61B 2562/18; A61B 5/0015;
(Continued)

(56) References Cited

U.S. PATENT DOCUMENTS

| 4,605,914 A | * | 8/1986 | Harman | ............. | H01B 11/1891 |
| | | | | | 333/237 |
| 5,534,869 A | * | 7/1996 | Harman | ............. | G08B 13/2497 |
| | | | | | 340/850 |

(Continued)

OTHER PUBLICATIONS

Antonio Faraone, et al.: "Systems and Methods for Controlling Wireless Power Transfer", U.S. Appl. No. 15/043,786, filed Feb. 15, 2016, all pages.
(Continued)

*Primary Examiner* — Jianxun Yang
(74) *Attorney, Agent, or Firm* — Barbara R. Doutre (57) ABSTRACT

A communication system (100) provides a body wearable garment (102) having a single transmission line (104) for interfacing a main control device (110) to a variety of supplemental devices (108). The single transmission line (104) provides a series of couplers (106) integrated along the line to wirelessly couple the plurality of supplemental devices (108) with the main control device (110). The plurality of supplemental devices (108) are insertable and removable to pouches (114) within the garment, the pouches providing alignment of each supplemental device with a corresponding coupler of the single transmission line (104). Near field wireless power transfer coupling and/or RF signaling are provided. A wide variety of devices can be optimally located along the single transmission line (104) within the garment allowing for considerable improvement of in hands-free portability.

20 Claims, 4 Drawing Sheets

(51) Int. Cl.
*H04W 4/80* (2018.01)
*H04B 5/00* (2006.01)
*A41D 1/00* (2018.01)

(52) U.S. Cl.
CPC ......... *H04B 5/0031* (2013.01); *H04B 5/0037* (2013.01); *H04W 4/80* (2018.02); *A41D 1/005* (2013.01); *H04B 2001/3855* (2013.01)

(58) Field of Classification Search
CPC ....... A61B 5/0031; A61B 5/0059; A61B 5/01; A61B 5/053
See application file for complete search history.

(56) References Cited

U.S. PATENT DOCUMENTS

| | | | |
|---|---|---|---|
| 5,786,325 A | 7/1998 | Borromeo et al. | |
| 6,480,163 B1* | 11/2002 | Knop | H01Q 13/203 333/237 |
| 8,853,891 B2 | 10/2014 | Soar | |
| 9,306,399 B2 | 4/2016 | Kim et al. | |
| 9,318,898 B2 | 4/2016 | John | |
| 9,318,922 B2 | 4/2016 | Hall et al. | |
| 2002/0045363 A1 | 4/2002 | Tilbury et al. | |
| 2009/0157067 A1* | 6/2009 | Kane | A61B 18/1206 606/33 |
| 2013/0162500 A1* | 6/2013 | Coldrey | H01Q 1/007 343/904 |
| 2014/0135593 A1* | 5/2014 | Jayalth | A61B 5/0022 600/301 |
| 2016/0181823 A1 | 6/2016 | Durham et al. | |
| 2017/0143977 A1 | 5/2017 | Kaib et al. | |

OTHER PUBLICATIONS

The International Search Report and the Written Opinion, corresponding serial No. PCT/US2018/04534 filed Jul. 2, 2018, dated Sep. 24, 2018, all pages.

* cited by examiner

APPARATUS FOR MANAGING A PLURALITY OF DEVICES IN A PORTABLE COMMUNICATION SYSTEM

BACKGROUND OF THE INVENTION

Public safety communication systems continue to evolve in an effort to provide optimal communication services and features within public safety environments, such as law enforcement, fire rescue, and emergency medical to name a few. Managing numerous public safety devices by a single individual user can be cumbersome, particularly for those users operating the devices under harsh environments, such as smoke, fire, and rain. Additionally, different kinds of public safety scenes may require different types of devices, and a user may be limited as to the number of devices that can be carried. The ability to provide seamless control of a variety of devices has thus become increasingly desirable for public safety personnel.

Accordingly, there is a need to improve the management of a plurality of communication devices so as to facilitate operation of such devices in a portable environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein a communication system that provides seamless management of a plurality of devices in a body wearable environment. The body wearable communication system utilizes a single transmission line integrated within a garment and to which are coupled a plurality of supplemental devices. The single transmission line allows for improved management of the plurality of supplemental devices thereby facilitating operation within a portable or wearable environment, which may or may not be part of a personal area network (PAN).

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

Figure 1:
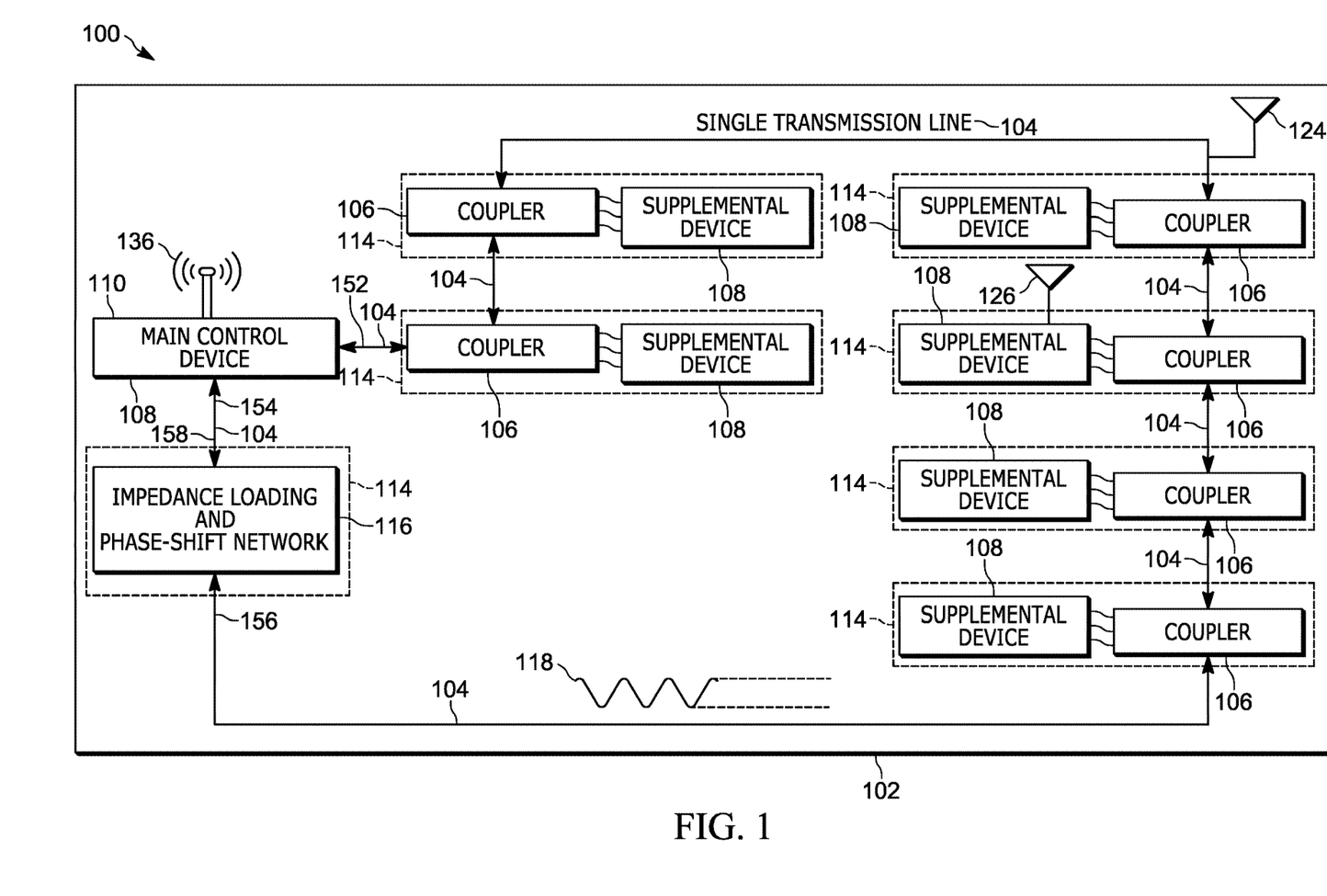
FIG. 1 is a block diagram of a communication system formed and operating in accordance with various embodiments.

FIG. 1 is a block diagram of a portable communication system 100, formed and operating in accordance with various embodiments. The communication system 100 comprises a body wearable garment 102, such as a vest, jacket or other article of clothing that can be worn and removed by an individual. Integrated within the garment 102 is a single transmission line 104, the single transmission line comprising a plurality of couplers 106 integrated therein. The communication system 100 further comprises a main control device 110 which is a battery operated device having a microprocessor, such as a battery-powered radio communication device, and a plurality of supplemental devices 108, wherein the plurality of supplemental devices 108 are body worn devices insertable within pouches 114 of the garment 102. Main control device 110 further comprises an antenna system 136 for transmitting and receiving within a radio communications network, such as a land mobile radio network or other communications network. In accordance with some embodiments, each one of the plurality of supplemental devices 108 is coupled to the single transmission line 104 via a corresponding one of the plurality of couplers 106. In accordance with some embodiments, the single transmission line 104 further comprises an impedance-loading and phase-shift network 116 integrated therein. The impedance loading and phase-shift network 116 may be under the control of main control device 110 or alternatively controlled by one of the plurality of supplemental devices 108. The impedance-loading and phase shift network 116 adjusts impedance load (magnitude and phase) presented to transmission line 104 at their mutual interfaces to enable the efficient transfer of signals or power between the couplers 106 and the different supplemental devices 108, as well as communication amongst the different supplemental devices, as appropriate.

Figure 2:
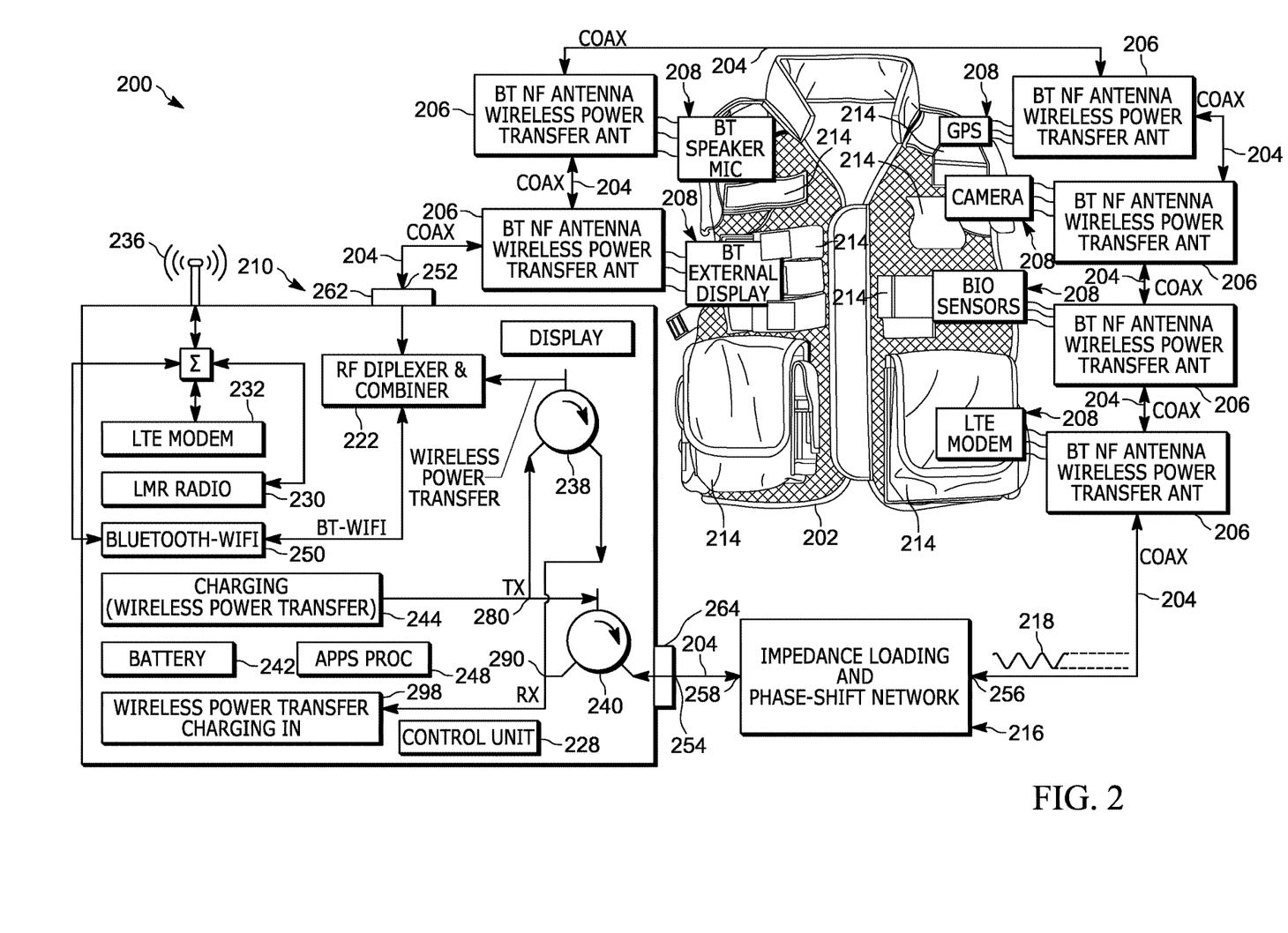
FIG. 2 is a first example of the communication system formed and operating in accordance with various embodiments.

In some embodiments, the single transmission line 104 may be coupled to the main control device 110 via a wired interface, for example a radio frequency (RF) connector, or a wireless interface, for example, via inductive coupling. The single transmission line 104 can thus form a full loop to and from the main control device 110. In some embodiments, the impedance loading and phase shift network 116 can be terminated at the second end 158 of the single transmission line 104, thereby providing a terminated, non-loop formation. In some embodiments, the second interface 264 may be absent or remain disconnected, and the second end 258 of impedance loading and phase shift network 216 may remain disconnected, or be also absent. In this case, the impedance loading and phase shift network 216 is typically the last supplemental device at the far end of single transmission line 204 from first end 252.

The single transmission line 104 may comprise a cable with the plurality of couplers 106 formed therein to provide coupling to the supplemental devices 108. The cable may comprise a coaxial cable, a twisted pair cable, an Ethernet cable or other cable type single transmission line capable of transferring signals, such as radio frequency (RF), voice, data, video signals, and/or electrical power over a single transmission line. The single transmission line 104 can be formed of multi-conductor lines, for example two pairs of wires, one for supply/power and another for configuring a termination load for predetermined impedance characteristics. For instance, the single transmission line 104 may comprise a plurality of conductor lines forming a multi-conductor transmission line so as to accommodate several couplers 106 capable of wirelessly interfacing with several different kinds of supplemental devices having different coupling mechanisms.

In general, a cable assembly comprising a number N of conductors may support a number N−1 of transmission line propagating modes, each mode being capable of propagating a distinct electrical signal. Not all transmission line propagating modes are necessarily used. For instance, a cable assembly featuring two thinly spaced apart coaxial cables, the coaxial cable being a well-known type of transmission line that has an inner conductor surrounded by a tubular insulating layer which is surrounded by a tubular conducting shield, features four conductors (two shields and two inner conductors) and can support three transmission line propagating modes; two of the modes can be defined as those corresponding to guided waves within each coaxial cable, and the third one being the parallel wire pair mode featuring to electromagnetic waves guided by the thinly spaced apart tubular conducting shields. In some instances, the latter, third mode may not be practical since it could exhibit a variable impedance along its route due to variable spacing between the tubular conducting shields, low characteristic impedance of the guided mode compared with transceivers requirements, and susceptibility with respect to external interferences since a parallel wire line is an open waveguide, while the first and second modes propagating within the respective coaxial cables have well controlled impedance and are substantially immune from interferences.

Because each individual multi-conductor transmission line propagating mode is substantially independent of the others, a specific individual behavior, for instance a voltage standing-wave ratio (VSWR), can be advantageously realized for each individual mode substantially independently through suitable loading of the multi-conductor transmission line along its route and at its terminations. This capability can be useful to selectively increase or depress coupling between couplers 106 and supplemental devices 108, as it will be illustrated in the following.

Besideas a coaxial cable, other technologies can be suitable to realize single transmission line 104. Twisted pair cabling provides a type of wiring in which two or more conductors are twisted together for the purposes of canceling out electromagnetic interference (EMI) from external sources. Ethernet cabling allows computer type but also other kinds of devices (e.g., audio, or electrical power transfer devices) to be interconnected in order to communicate between them. Flexible ribbon cables, featuring closely spaced parallel conductors, are a suitable kind of multi-conductor single transmission line 104 that supports a plurality of propagation modes.

In accordance with some embodiments, the single transmission line 104 can be integrated within the garment, such as by being sewn into the garment, or retained via snaps, tabs, sheath or other suitable integration attachment means. Dependent upon the type of supplemental devices 108 being used in the communication system 100, the single transmission line 104 may be used to carry RF signals and/or wireless power transfer (WPT) signals, DC power signals, and audio signals to name a few. For instance, the RF signals may include voice, data, video, and RF power over the single transmission line 104 between the main control device 110 and supplemental devices 108, or among supplemental devices 108. The impedance-loading and phase shift network 116 controls a voltage standing wave ratio (VSWR) for each of the plurality of waveforms, for instance waveform 118, along the single transmission line 104 in order to present favorable, predetermined voltage and current characteristics in correspondence of select couplers 106 and their corresponding supplemental devices 108.

The plurality of couplers 106 integrated within the single transmission line 104 may provide wireless RF signal transfer to and from the plurality of supplemental devices 108. The plurality of couplers 106 integrated within the single transmission line may further provide wireless power transfer from a battery (battery 242 shown and described later in FIG. 2) of the main control device 110 to the plurality of supplemental devices 108. In some embodiments, the converse is also possible, as one or more of the plurality of supplemental devices 108 may provide backup power over the single transmission line 104 to the main control device 110, such as through a backup battery pack as being one of the supplemental devices 108, as well as to other supplemental devices 108. The couplers 106 may provide wireless power transfer (WPT) through, for instance, the integration of wireless power transfer wire coils housed inside the vest for aligning with an appropriate supplemental device of the plurality of supplemental devices 108. Other coupling mechanisms, for instance capacitive, radiative, and galvanic, can similarly be employed, as described later.

In accordance with the various embodiments, the plurality of supplemental devices 108 are typically wireless-chargeable battery-operated portable devices which are insertable into and removable from a plurality of corresponding shielded pockets or pouches 114, which may be respectively assigned for each type/model of supplemental device 108 or may be generic. The plurality of supplemental devices 108 may comprise communication devices or electrical non-communication devices. For example, a wearable camera is a communication device, while a backup battery-pack is an electrical non-communication device. The use of shielded pockets or pouches 114 beneficially limits RF leakage and desense. The shielding material for the pouches or pockets 114 may comprise, for example, metalized cloth, and/or plated polymer to name a few. The shielded pockets minimize chances of "RF sniffing" of the communication signals by outsiders and further minimizes transmitter desensitization from stronger outside RF signals (e.g., nuclear electromagnetic pulses, or NEMPs). Ferrite-backed WPT coils can be used for the RF power transfer.

Hence, the plurality of supplemental devices 108 are wirelessly coupled to the single transmission line 104. In some embodiments, the plurality of supplemental devices 108 may be integrated within the single transmission line 104 itself, when such devices are intended as permanent, non-removable devices to the communication system 100. For example, impedance-loading and phase shift network 116 may be integrated within the single transmission line 104 itself.

The shielded pouches or pockets 114 may provide RF shielding in all directions departing from all faces of a supplemental device 108 surface. In this case, supplemental device 108 will be substantially shielded electromagnetically and unable to wirelessly connect to other devices and systems other than through single transmission line 104 since radiated emissions towards the exterior of the vest 102 will be substantially attenuated by pouch 114. In some embodiments, one of the supplemental devices 108 that does not need to be wirelessly connected to the exterior of pouch 114 may be a backup battery pack that can be placed in such a pouch or pocket. Alternatively, the shielded pouches or pockets 114 may provide RF shielding in some but not all directions departing from a supplemental device 108 surfaces. In this case, an antenna hosted on supplemental device 108 may be able to establish a wireless link with other devices and or systems exterior to pouch 114, said other devices being either hosted by the user or remotely placed. For instance, a Wi-Fi enabled video-camera could be placed in pouch 114 and still operates satisfactorily if the hosted Wi-Fi antennas can still operate with sufficient performance.

As battery life is limited for all portable devices, it is important that communications between body-worn devices be as efficient as possible from an energy consumption perspective. One of the advantages of using the single transmission line 104 is that operation of the line as a radio frequency (RF) transmission line functionally interconnects body-worn devices such that RF communication link margins between the supplemental devices 108 are far larger than in the case where the devices have to communicate through radiated fields. In fact, it is not uncommon to experience 60-80 dB propagation loss for on-body communications, for instance Bluetooth or Wi-Fi links between body-worn devices of wireless on-body communication systems. Now, in accordance with the embodiments, delivering RF signals between supplemental devices 108 through single transmission line 104 and respective couplers 106 increases the RF link margin substantially since the propagation loss between devices so interconnected can be 10-50 dB lower than for wireless on-body communication systems, which in turns allows extending their battery life due to substantially lower RF transmit power required to achieve a predetermined minimum RF communication link margin.

Thus, the minimization of on-body propagation loss advantageously provides for substantially greater RF communication link margin thereby allowing the supplemental devices 108 to operate at lower power levels and achieve substantially longer battery life. Furthermore, by inserting the supplemental devices 108 into their respective shielded pockets or pouches 114, which in the past would have degraded the performance of any of the antennas in supplemental devices 108, no longer compromises the ability of the supplemental devices to interconnect since the RF link between them relies on guided propagation within single transmission line 104, featuring substantially lower propagation loss compared to the case of wireless propagation across and around the body.

Communication may take place between the plurality of supplemental devices 108 with the main control device 110, as well as amongst the plurality of supplemental devices 108 themselves, and also with other communication devices operating within a PAN network or Wi-Fi network or a cellular network, or a public-safety network, or a private radio network, and the likes. In accordance with some embodiments, the couplers 106 of the single transmission line 104 may provide one or more of: capacitive coupling, inductive coupling, galvanic coupling, and radiated coupling. Capacitive coupling can be realized by transferring RF power through capacitances realized between coupler 106 and portions of a corresponding supplemental device 108. Inductive coupling can be realized by transferring RF power through an inductive coil hosted on coupler 106 and an inductive coil hosted on a corresponding supplemental device 108. Radiated coupling can be realized by transferring RF power through an antenna located on coupler 106 and an antenna located on a corresponding supplemental device 108. Galvanic coupling can be realized by transferring RF power through direct galvanic contact between electrodes hosted on coupler 106 and electrodes hosted on a corresponding supplemental device 108.

Some of the supplemental devices 108 can be designed to manipulate the RF waveform along the single transmission line 104. For instance, the voltage standing-wave ratio (VSWR) along single transmission line 104 can be manipulated by means of predetermined supplemental devices out of the plurality of supplemental devices 108 that are specifically designed and intended to introduce impedance discontinuities at predetermined locations along single transmission line 104. Additionally, these are among the kinds of supplemental devices 108 that can permanently be integrated with single transmission line 104 without requiring corresponding coupler 106 and pouch 114 since their only purpose would be to manipulate the waveforms along line 104. Introducing an impedance discontinuity along a RF transmission line alters the VSWR along such a line. As a consequence, the ratio of maxima and minima of voltage and current magnitudes, as well as their respective locations along such a line, can be manipulated. The voltage and current magnitudes can be further manipulated by placing a plurality of said discontinuities along said single transmission line. Realizing a RF resonator frequently requires two or more impedance discontinuities along a transmission line, for example a microwave waveguide. Thefore, employing multiple discontinuities, for instance through the engagement of network 116 and one or more of the devices 108, may lead to larger greater flexibility is establishing a desired VSWR behavior along line 104. Hence, in accordance with the embodiments, it is now possible to realize significant build up of reactive RF energy along select predetermined sections of a single transmission line 104, with the purpose of effecting predetermined behaviors. One said behavior could be to effect filtering of the RF waveform in the frequency domain. Another said behavior could be to enhance voltage or current magnitudes, or conversely depress them, at select locations along the single transmission line 104.

The VSWR manipulation can be employed, for example, in order to realize a predetermined level of voltage or current at select locations along single transmission line 104, for instance in correspondence of select couplers 106 in order to enhance the effectiveness of coupling RF energy from the coupler 106 to the corresponding supplemental device 108. This enhancement can be due, for instance, to the establishment of a high-magnitude current peak at a location along single transmission line 104 where one of the couplers 106 is embodied as an inductive coupler. Since inductive couplers rely on the generation of a magnetic field whose magnitude is proportional to the transmit coil current magnitude, increasing the latter leads to larger RF energy coupling into the receive coil on the corresponding supplemental device 108 and faster charge-times. Therefore, the synthesis of the predetermined VSWR behavior along line 104 generates predetermined voltage and current distributions suitable for charging select supplemental devices 108.

In accordance with some embodiments, in addition to the near field coupling provided by the couplers 106, the single transmission line 104 may further comprise a a RF antenna 124 providing wireless RF coupling to one or more of the supplemental devices 108 having a corresponding RF antenna 126. This RF signal coupling can be provided using a band-specific RF antenna 124, integrated within the single transmission line 104, which can enable a wireless link a supplemental device 108 equipped with a compatible RF antenna 126, without requiring that the communication go through the coupler 106 (for instance, this coupler may be only intended for charging but not communicating at the frequency of the RF antennas 124 and 126).

Unwanted RF signals, such as a WPT waveform that could be currently charging another device along single transmission line 104, may be filtered out at each coupler through a filter-network, such as a SAW Filter, LC Filter, to name a few.

As mentioned previously, each of the plurality of supplemental devices 108 is insertable to and removable from pre-assigned shielded pouches or pockets 114. The use of shielded pouches 114 and wireless coupling advantageously minimizes interference between devices and provides user flexibility in the retention and camouflaging of the devices.

In accordance with some embodiments, at least one of the plurality of supplemental devices 108 is chargeable by the battery of the main control device 110.

In accordance with some embodiments, the coupler devices 106 may comprise a plurality of near field antennas coupled to the single transmission cable. The coupler devices 106 may further comprise a plurality of wireless power transfer (WPT) antennas selectively coupled to some of the plurality of supplemental devices 108. In accordance with some embodiments, the plurality of near field antennas of the single transmission line provide respective near field coupling to the plurality of WPT antennas of the plurality of supplemental devices 108. The plurality of supplemental devices 108 are chargeable using WPT antennas from the single transmission line 104.

In accordance with some embodiments, the single transmission line 104 comprises a first end 152 operatively coupled to an interface of the main control device 110, and a second end 154 operatively coupled to another interface of the main control device 110. The impedance loading and phase shift network 116 may comprise an input 156 and an output 158 with which to couple along the single transmission line 104. In some embodiments, the single transmission line 104 forms a loop with the main control device 110. Alternatively, the output 158 of impedance loading and phase shift network 116 may remain disconnected, or be absent. In this case, the impedance loading and phase shift network 116 is typically the last supplemental device at the far, second end 154 of single transmission line 104.

In accordance with some embodiments, the impedance loading and phase shift network 116 captures unused wireless power transfer energy arriving through single transmission line 104 after traveling through all couplers 106. This power can be used to recharge the battery of main control device 110, among other uses, through second end 154.

The impedance loading and phase shift network 116 changes the loading impedance magnitude presented to the single transmission line 104 as well as phase with which to manipulate voltage and current standing waves, for instance, to shift high-magnitude current or voltage peaks towards predetermined supplemental devices 108 that require charging. Additionally, when the single transmission line 104 is a multi-conductor transmission line, the impedance loading and phase shift network 116 changes the loading impedance magnitude and phase for select or all of the propagating models along single transmission line 104. For example, the network 116 provides impedance/phase-varying network that can be used in conjunction with the aforementioned impedance discontinuities to shift and enhance or depress the RF standing-waves of each individual mode propagating on single transmission line 104 and move the highest voltage or current (depending on the type of coupler 106, inductive, capacitive, galvanic) magnitude to the individual PAN device that needs charging the most at any given time. The impedance loading and phase shift network 116 can be designed using known electronic circuitry.

Thus, the single transmission line 104 to body wearable garment 102 of communication system 100 can advantageously provide at least one or both of a communication path, via the near field RF signaling (Bluetooth or Wi-Fi), and a charging path, via the near field WPT, under the control of battery-operated main control device 110 to one or more of the plurality of supplemental devices 108. Additionally, single transmission line 104 can provide a communication path, as well as a charging path, between the supplemental devices 108. For instance a first supplemental device could be an emergency battery pack that, under predetermined circumstances, is activated to charge a second supplemental device through single transmission line 104, while the second supplemental device may be communicating with third and fourth supplemental devices through the same single transmission line, using for instance a different available propagating mode or the same mode but a difference frequency band compared with the charging signal, or the same mode and frequency band of the charging signal but a specific signal encoding or access scheme that allows discriminating the communication signal from the charging signal. Advantageously, the signals that may be sent over the single transmission line 104 may comprise a WPT waveform, and a plurality of RF communication waveforms associated with each supplemental device, such as standard Bluetooth, Wi-Fi, NFC, LTE, GPS waveforms, proprietary signaling waveforms, and any other electrical communication signaling including audio waveforms.

FIG. 2 shows a first example embodiment for a body wearable communication system 200 formed and operating in accordance with various embodiments comprising a body wearable garment 202 having a single transmission line 204 in the form of a coaxial cable integrated within the garment. In this embodiment, the single transmission line 204 provides a full loop to and from the main control device 210 via coaxial connectors 262, 264. The body wearable garment 202 further comprises a plurality of shielded pouches 214. Near field coupling WPT and RF signal coupling occur inside the shielded pouches 214.

In accordance with this embodiment, the main control device 210 may be a converged device comprising land mobile radio (LMR) technology 230, such as appropriate transceiver, and a long term evolution (LTE) modem 232. The main control device 210 comprises a control unit (or controller) 228 which in conjunction with LMR technology 230 provides two-way radio communications via a push-to-talk (PTT) button (not shown). Main control device 210 further comprises an antenna system 236 for transmitting and receiving within a LMR communications network, a LTE communications network, a WiFi/Bluetooth communications network, and the like. A plurality of circulators 238, 240 route transmit and receive signals along routes in which one branch features a splitter 280 (in the transmit route) and another branch features a combiner 290 (in the receive route). The main control device 210 further comprises a battery 242 and charging capability 244, applications processor 248, and personal area network (PAN) capability, such as Bluetooth and/or Wi-Fi capability 250. The battery powered, main control device 210 can be worn within the garment 202 of the body worn communication system, or for instance it can be body-worn at the belt. The main control device 210 may further comprise read-only memory (ROM), random access memory (RAM), other non-transitory computer-readable media, or a combination thereof. The controller 228 is configured to retrieve instructions and data from the applications processor 248 and memory and execute, among other things, instructions to perform charging of the supplemental devices 208, which are coupled to the single transmission line 204 through couplers 206.

In accordance with some embodiments, the plurality of supplemental devices 208 may comprise a plurality of PAN devices. For example, the plurality of supplemental devices 208 may comprise the following wireless devices: a remote speaker microphone, an external display, a global positioning system (GPS) device, a camera, a biometric sensor and/or other devices which can wireless interoperate with and be charged by the main control device 210 via the single transmission line 204. The plurality of supplemental devices 208 may communicate using one or more of: Wi-Fi signaling and other kinds of PAN signaling via the single transmission line 204.

In accordance with some of the embodiments, the single transmission line 204, embodied as a coaxial cable, comprises a first end 252 coupled to the main control device 210 via an interface 262, and a second end 254 coupled to the main control device 210 via another interface 264. The impedance loading and phase shift network 216 is integrated towards the second end 254 of the single transmission line 204 and has an input 256 and an output 258. The single transmission line 204 forms a loop with the main control device 210. Alternatively, the second interface 264 may be absent or remain disconnected, and the second end 258 of impedance loading and phase shift network 216 may remain disconnected, or also be absent. In this case, the impedance loading and phase shift network 216 is typically the last supplemental device at the far end of single transmission line 204 from first end 252.

The impedance loading and phase shift network 216 changes the loading impedance magnitude as well as its phase at the second end 254 of the coaxial cable to manipulate voltage and current standing waves 218 along single transmission line 204, for instance, to shift high-magnitude current or voltage peaks towards predetermined supplemental devices 208 that require charging. For instance, the network 216 provides an impedance/phase-varying network that can be used in conjunction with the aforementioned impedance discontinuities to shift and enhance or depress the RF standing-waves along coaxial cable 204 and move the highest voltage or current (depending on the type of coupler 206, inductive, capacitive, galvanic) magnitude to the coupler 206 associated to the individual supplemental device 208 that needs charging the most at any given time.

In accordance with some embodiments, an output 258 of network 216 feeds unused wireless power transfer energy back to control device 210 via single transmission line 204, circulator 240 to a power accumulator 298, which can supplement the battery 242 as needed. Thus, the use of switches, circulators, duplexers, and other electrical devices, at one or both of the single transmission line cable ends enables using leftover WPT and RF communication signal power to recharge the main control device 210 battery through WPT charging in component 298 thus prolonging device 210 own battery life.

The communication system 200 is a body wearable system formed of a vest with single transmission line 204 providing the ability to couple both WPT and RF communication signals to a plurality of body worn devices. The system 200 provides enhanced link margin and extended battery life to all devices operating within the system, including the main control device 210, which in some embodiments, can be a converged device providing LMR and LTE wireless connectivity.

The use of shielded pouches 214 used to receive the supplemental body worn devices limits RF leakage, thereby increasing security, important in the context of undercover operations. The conductive lining of the shielded pouch 214 minimizes outside sniffing of wireless signals as well as desensitization by outside RF sources. There can also be an opening in the front or side of the conductive pouch to accommodate an RF antenna for a wireless supplemental device 208.

The closed loop single transmission line 204 enable wireless power transfer charging between two ends of the cable, further allowing the establishing of a standing wave pattern 218 of controllable voltage standing wave ratio (VSWR) whose voltage and current peaks can be shifted (using impedance loading phase shifter 216 as well as select supplemental devices 208) along the length of the cable to optimize charging efficiency dynamically for predetermined supplemental devices 208, based on a variety of criteria (which can be need, urgency, priority, observed and predicted usage). To this end the network 216 may be reconfigurable based on inputs received from the main controller 210 or any of the supplemental devices 208 so enabled. Therefore, the communication system 200 includes means to communicate between network 216, controller 210, and devices 208 through single transmission line 204, wherein communication between network 216 and devices 208 also goes through couplers 206.

Figure 3:
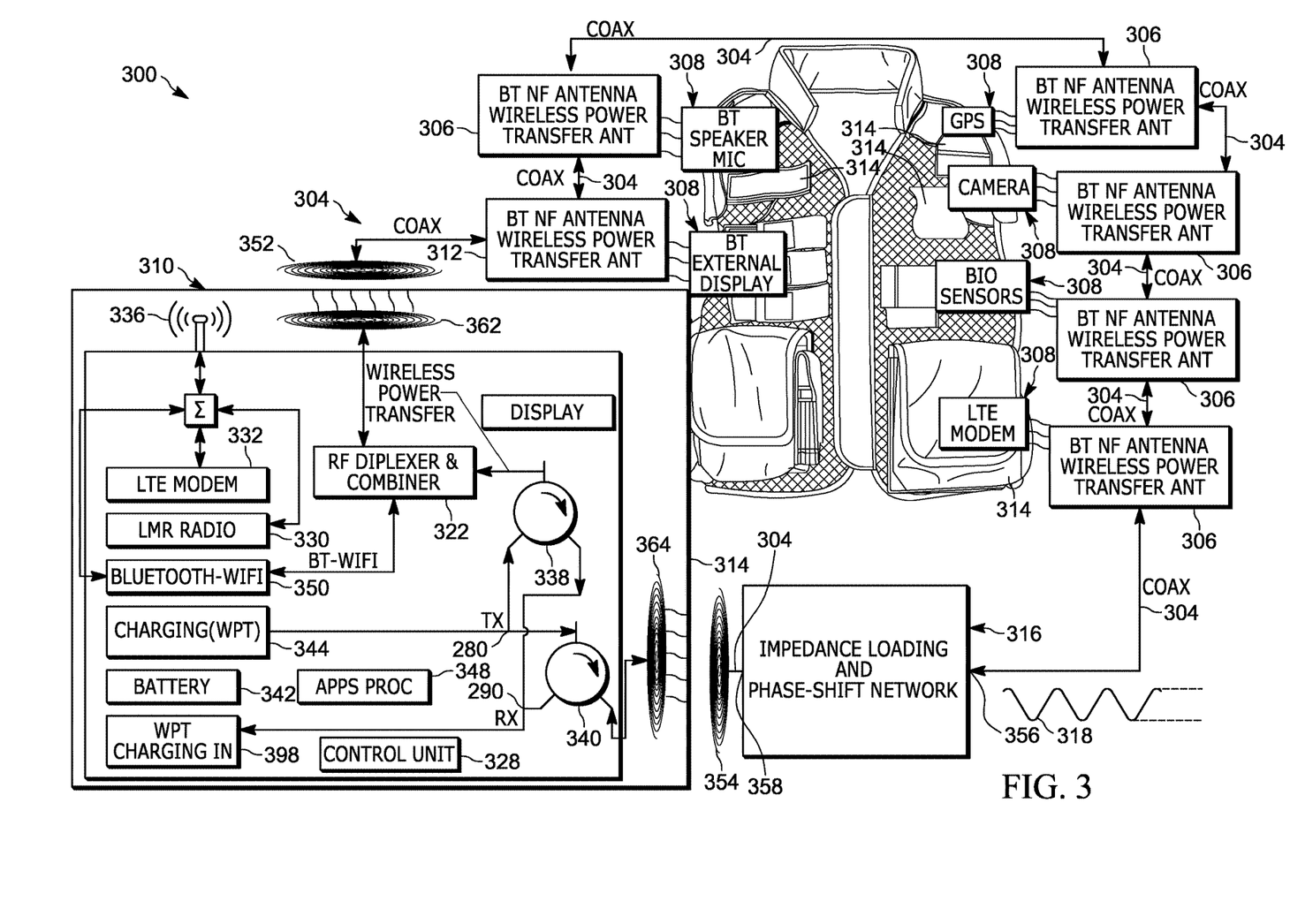
FIG. 3 is a second example of the communication system formed and operating in accordance with various embodiments.

FIG. 3 is a second example of the body worn communication system formed and operating in accordance with various embodiments. This embodiment differs from the embodiment of FIG. 2 in that the single transmission line 304 is wirelessly coupled, via inductive coupling coils 352, 354 to corresponding coils 362, 364 hosted on a main control device 310. In this embodiment, each coupler 306 of single transmission line 304 is again shown as comprising a Bluetooth near field antenna and wireless power transfer (WPT) antenna. The WPT antennas may be integrated within the couplers 306 of the single transmission line 304 in the form of inductive coupling coils, capacitive plates, and/or galvanic contacts to interface with corresponding elements located in the supplemental devices 308.

The embodiment of FIG. 3 operates in conjunction with operation described in FIG. 1 and FIG. 2 with the exception of the connector coupled, wired interface now being embodied as a wireless interface, via inductive coupling as described in the foregoing. Accordingly, the main control device 310 may be a converged device comprising land mobile radio (LMR) technology 330 with appropriate transceiver and a long term evolution (LTE) modem 332. The main control device 310 comprises a controller 328 which in conjunction with LMR technology 330 provides two-way radio communications via a push-to-talk (PTT) button (not shown). Main control device 310 further comprises an antenna 336 for transmitting and receiving within a LMR communications network. A plurality of circulators 338, 340 route transmit and receive signals along routes in which one branch features a splitter 380 (in the transmit route) and another branch features a combiner 390 (in the receive route). The main control device 310 further comprises a battery 342 and charging capability 344, applications processor 348, and personal area network (PAN) capability, such as Bluetooth and/or Wi-Fi capability 350. The battery-powered, main control device 310 can be worn within a garment 302 of the body worn communication system 300. The main control device 310 may further comprise read-only memory (ROM), random access memory (RAM), other non-transitory computer-readable media, or a combination thereof. The control unit 328 is configured to retrieve instructions and data the applications processor 248 and memory and execute, among other things, instructions to perform charging of the supplemental devices 308, which are wirelessly coupled to coaxial cable 304 through couplers 306.

Figure 4:
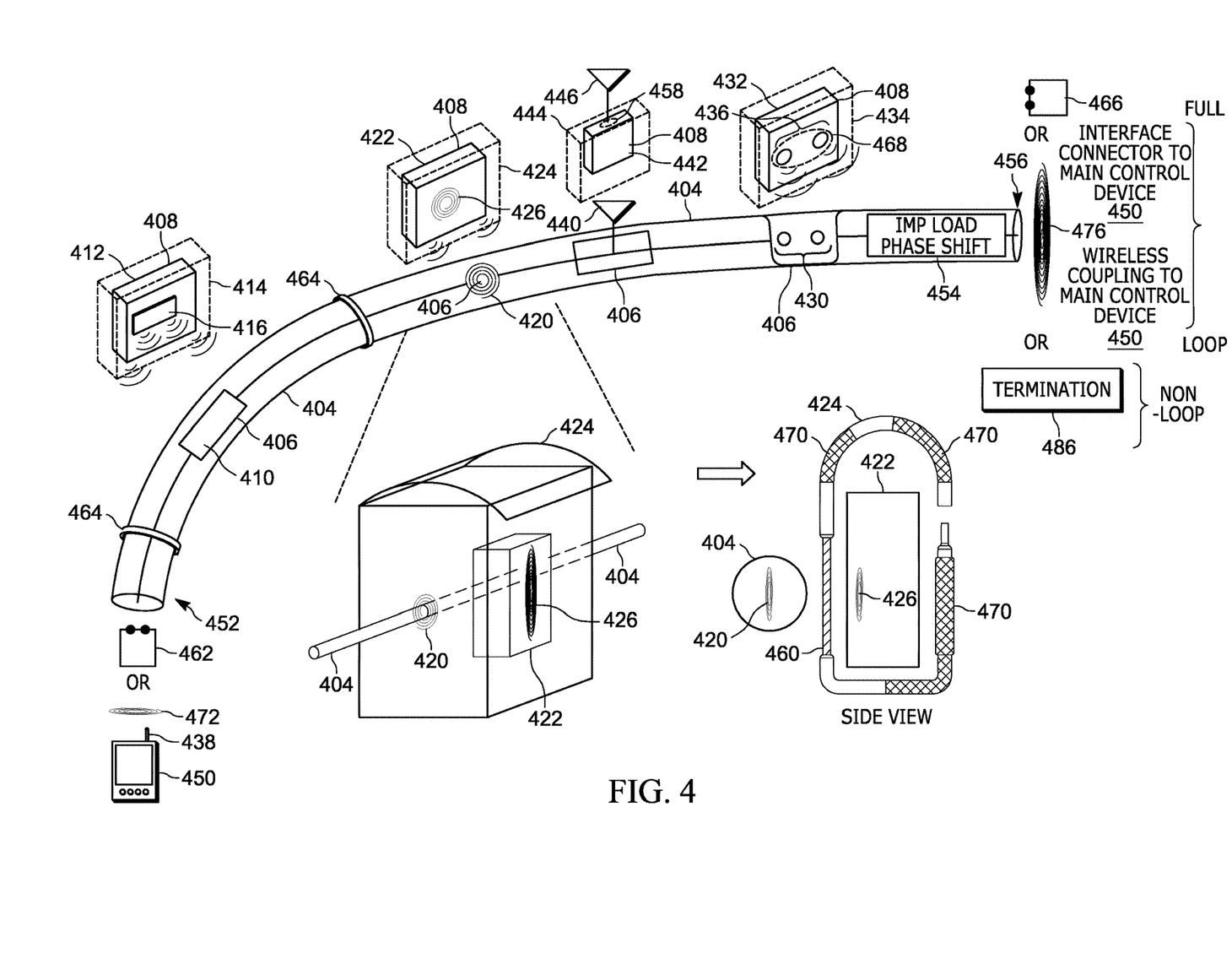
FIG. 4 is an example of a single transmission line for integrating within a garment and to which are coupled a plurality of supplemental devices operating in accordance with various embodiments.

FIG. 4 is an example of a single transmission line 404 for integrating within a garment and to which are coupled a plurality of supplemental devices operating in accordance with various embodiments. The single transmission line 404 is integrated into a garment (shown in other figures) via attachment means 464 such as snaps, clips, or sewn into integrated sheath of the garment. FIG. 4 shows the single transmission line 404 embodied as a coaxial cable for coupling (wired or wirelessly) to a main control device 450, however other single transmission line cabling may be used. Main control device 450 further comprises an antenna 438 for transmitting and receiving within a radio communications network, such as an LMR network, a LTE network, a WiFi network, and the likes. In accordance with some embodiments, a plurality of couplers 406 are provided between a first end 452 and a second end 456 of the single transmission line 404. The plurality of couplers 406 integrated within single transmission line 404 may be all of the same type or varied. A varied composition is shown for example in FIG. 4, where the plurality of couplers 406 are embodied as a first capacitive coupler 410, a second inductive coupler 420, a third galvanic coupler 430, and a radio frequency (RF) antenna coupler 440. The single transmission line 404 further comprises an impedance loading and phase shift network 454, such as previously described.

In accordance with some embodiments, each of the plurality of transmission line couplers 406 comprising first capacitive coupler 410, second inductive coupler 420, third galvanic coupler 430, and radio frequency (RF) antenna coupler 440, interfaces to respective corresponding couplers 416, 426, 436, 446 associated with each of a plurality of supplemental communication devices 412, 422, 432, 442. The plurality of supplemental devices 412, 422, 432, 442 may comprise for example: a remote speaker microphone, an external display, a GPS device, a camera, a biometric sensor and/or other devices inserted into respective pouches 414, 424, 434 and 444 of the garment. Each pouch 414, 424, 434, 444 provides appropriate alignment and proximity for coupling of each supplemental device coupler 416, 426, 436, 446 with a respective transmission line coupler 410, 420 430, 440. Some of the pouches, such as pouches 444, 434 may comprise an opening or aperture, such apertures 458, 468 to accommodate an external antenna 446 or galvanic contacts 436, as applicable for the type of coupling.

In accordance with some embodiments, the single transmission line 404 may form a full loop with the main control device 450 such as through interface connectors 462, 466, or wireless coupling 472, 476 at the first and second ends 452, 456 of the single transmission line 404. As described previously, the single transmission line 404 can be formed of multi-conductor lines, for example two pairs of wires, one for supply/power and another for configuring the termination load for predetermined impedance characteristics.

In some embodiments, the impedance loading and phase shift network 466 can be terminated via a termination 486 at the second end 456 of the single transmission line 404, thereby providing a terminated, non-loop formation. In the non-loop embodiment, the single transmission line 404 does not return to the main control device 450. In the non-loop embodiment, the VSWR may be handled by or more of the supplemental devices 412, 422, 432, 442 which can be designated to introduce impedance discontinuities and potentially to also provide control for the impedance loading and phase shift network 466.

A few operational descriptive examples are provided for each coupling interface. When the first supplemental communication device 412 is inserted into the first respective pouch 414 of the garment, the first device coupler 416 of the first device 412 aligns with the first coupler 410 to single transmission line 404. In this example, the first couplers 410 and 416 may be formed of a single metal plate or a plurality of metal plates thereby providing for capacitive coupling between the respective plates. In accordance with the embodiments, the capacitively coupled plates 410, 416 provide for near field RF signaling and wireless power transfer to the first device 412 from the main control device 450 or from other supplemental devices 408.

When the second supplemental communication device 422 is inserted into the second respective pouch 424 of the garment, the second device coupler 426 of the second device aligns with the second coupler 420 to single transmission line 404. In this example, each coupler 420, 426 may be formed of an inductive coil thereby providing for inductive coupling therebetween. The inductively coupled coils 420, 426 allow for near field RF signaling and wireless power transfer to the second device 422 from the main control device 450. A ferrite member 460 may be embedded in the second pouch 424 to improve the coupling between the inductive coils 420, 426.

In accordance with some of the embodiments, a shield 470 may also be embedded in predetermined surfaces of a pouch, such as shown at the expansion view of second pouch 424 The shield 470 can be used to minimize sniffing of signals by others as well as to minimize emissions from, as well as electromagnetic interferences to, the supplemental device. Apertures, similar to aperture 458 of pouch 444 may be used to accommodate an external antenna, if applicable for the device. Additional openings can also be provided to the pouch for accommodating audio porting, or display viewing as appropriate.

When the third supplemental communication device 432 is inserted into the third respective pouch 434 of the garment, the third device coupler 436 of the third device 432 aligns with the third coupler 430 of single transmission line 404. In this example, each coupler 430, 436 may be formed of different metal contacts thereby providing for galvanic coupling therebetween, therefore the alignment has to be very precise for the respective contacts to establish proper electrical connection. The opening 468 within pouch 434 allows for direct touching to couple the contacts. The galvanically coupled contacts 430, 436 allow for RF signaling and wireless power transfer to the third device 432 from the main control device 450.

When the fourth supplemental communication device 442 is inserted into the fourth respective pouch 444 of the garment, the fourth device coupler, which in this case comprises antenna 448, protrudes through an aperture 458 of fourth pouch 444. Thus, RF signaling can take place between the antenna 446 of coupler 440, integrated within the single transmission 404, and the antenna 448 of the supplemental device 442. While coupler 440 is shown as a single antenna 440, it is understood that the single transmission line 404 can further comprise a plurality of band specific near field RF antennas as applicable to different corresponding supplemental devices 408. It is also understood that that the single transmission line 404 can comprise a variety of couplers providing a plurality of different wireless power transfer antennas as applicable to different corresponding supplemental devices 408. In accordance with some embodiments, one or more of the couplers 406 may provide for multiple means of coupling, for example both inductive and RF antenna coupling, and may interface with a pouch designed for a supplemental device 408 that can connect multiple coupling mechanisms. For instance, a supplemental device 408 may couple inductively with the corresponding coupler 406 for WPT charging, and couple through respective RF antennas for Bluetooth communications.

The various embodiments of communication system 100, 200, 300 and 400 lend themselves well to body wearable undercover law enforcement applications. For example, while a remote speaker microphone has been described as one of the plurality of supplemental devices, the microphone aspect can be extended to additional dispersed microphones and/or microphone arrays located within one or more of the supplemental communication devices dispersed along the single transmission line. Additional microphones/microphone arrays advantageously allow a user to proximately aim and direct his/her voice toward a predetermined or preferred microphone while other microphones along the single transmission line may be used to filter out ambient noise.

The supplemental devices of the various embodiments may further comprise recording devices dispersed in conjunction with the microphones along the single transmission line advantageously allowing public safety personnel working in undercover operations to record conversations in an inconspicuous manner. Vibration microphones may be used to sense vibrations in a speech source, while acoustic microphones may be used to detect sound waves transmitted through the air. The use of a garment allows for well controlled placement of devices, such as microphones and recorders. For example, a vibration microphone that senses the speech vibrations through direct physical contact with a speech source may be located up near a portion of the garment that sits near the through or neck, such as at a collar. Laser or other optical microphones may sense speech vibrations without direct physical contact with the speech source allowing for different placement options.

Dispersed cameras may be advantageously positioned along the single transmission line to record video and/or take photographs from a variety of positions. Small apertures can be provided in one or more pockets to allow exposure of a camera lens to the external environment, while keeping the camera body camouflaged within the pocket or pouch.

Accordingly, there has been provided a communication system in a body wearable form factor that provides improved control and battery life over a plurality of communication devices through the integration of a single transmission line within a garment which manages signal distribution from a main control device to a plurality of supplemental devices. In addition to undercover law enforcement applications, the variety of devices optimally located along a single transmission line within a garment allows for considerable improvement of portability in that the user need not carry numerous devices by hand.

Multiple wearable devices can now be deployed in a personal area network (PAN) on a public safety vest formed in accordance with the embodiments. The body worn communication system provides local localized wireless charging and reliable RF links between the transceivers of the supplemental devices and the host, main device as well as security against outside RF detection and protection from RF desensitization.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable communication system, comprising:
a body wearable garment;
a main control device having a controller and transceiver powered by a battery;
a single transmission line integrated within the body wearable garment;
a plurality of supplemental devices wirelessly coupled to the single transmission line when worn on the body wearable garment;
a plurality of couplers providing wireless coupling to the plurality of supplemental devices;
an impedance loading and phase shift network integrated within the single transmission line; and
wherein the single transmission line has first and second ends, the first end operatively coupling to the main control device, and the second end providing a termination to the impedance loading and phase shift network integrated within the single transmission line, wherein the impedance loading and phase shift network further operatively couples back to the main control device so as to form a loop.

2. The portable communication system of claim 1, wherein the main control device comprises a battery powered radio communication device; and the plurality of supplemental devices coupled to the single transmission line comprises a plurality of personal area network (PAN) devices wirelessly coupled to the single transmission line.

3. The portable communication system of claim 1, wherein at least one of the plurality of supplemental devices is chargeable by the battery of the main control device.

4. The portable communication system of claim 1, wherein the single transmission line provides both a communication path and a charging path to at least one of the plurality of supplemental devices.

5. The portable communication system of claim 1, wherein the single transmission line comprises a coaxial cable.

6. The portable communication system of claim 1, wherein the single transmission line comprises a twisted pair.

7. The portable communication system of claim 1, wherein the single transmission line comprises an Ethernet cable.

8. The portable communication system of claim 1, wherein the single transmission line comprises a plurality of couplers providing wireless coupling to the plurality of supplemental devices.

9. The portable communication system of claim 8, wherein the plurality of couplers provide one or more of: capacitive coupling, inductive coupling, and galvanic coupling to one or more of the plurality of supplemental devices.

10. The portable communication system of claim 9, wherein the single transmission line provides a radio frequency (RF) transmission line to functionally interconnect the couplers to the plurality of supplemental devices thereby increasing RF communication link margins between the plurality of supplemental devices, thereby extending battery life of each of the plurality of supplemental devices.

11. The portable communication system of claim 1, wherein reactive RF energy is built up along predetermined sections of the single transmission line for affecting predetermined behaviors of the plurality of supplemental devices.

12. The portable communication system of claim 1, further comprising:
a plurality of near field antennas coupled to the single transmission line;
a plurality of wireless power transfer (WPT) antennas coupled to one or more of the plurality of supplemental devices; and
the plurality of near field antennas of the single transmission line providing respective near field coupling to the plurality of WPT antennas of the one or more of the plurality of supplemental devices.

13. The portable communication system of claim 1, wherein the main control device comprises a portable land mobile radio (LMR) radio with long term evolution (LTE) modem; and
the plurality of supplemental devices comprise two or more of: a remote speaker microphone, an external display, a global positioning system (GPSO device, a camera, a biometric sensor.

14. The portable communication system of claim 1, further comprising:
a plurality of shielded pouches integrated within the body wearable garment for receiving each of the plurality of supplemental devices, wherein near field coupling wireless power transfer (WPT) and near field radio frequency (RF) signal coupling occur inside the plurality of shielded pouches between each of the plurality of supplemental devices and the single transmission line; and
an opening in one or more of the shielded pouches for accommodating a RF antenna of at least one of the plurality of supplemental devices to accommodate the RF signal coupling.

15. The portable communication system of claim 14, wherein the near field RF signal coupling occurs via one or more of Bluetooth coupling and Wi-Fi coupling.

16. The portable communication device of claim 1, wherein the plurality of supplemental devices are wireless-chargeable battery-operated portable devices.

17. The portable communication device of claim 1, wherein selective increasing and depressing of the wireless coupling between the plurality of couplers and the supplemental devices enables charging of those supplemental devices having the most need at any given time.

18. The portable communication device of claim 1, wherein a voltage standing-wave ratio (VSWR) along the single transmission line is further manipulatable by predetermined supplemental devices of the plurality of supplemental devices that introduce impedance discontinuities at predetermined locations along single transmission line.

19. The portable communication device of claim 1, wherein the impedance loading and phase shift network provide a manipulatable standing wave pattern for selectively controlling the wireless coupling between the plurality of couplers and the supplemental devices.

20. The portable communication device of claim 1, wherein the impedance loading and phase shift network adjust impedance load (magnitude and phase) presented to the single transmission line; and the impedance loading and phase shift network providing a manipulatable standing wave pattern for selective electromagnetic coupling and predetermined voltage and current distributions along the single transmission line for selectively shifting, increasing and depressing the wireless coupling between the plurality of couplers and the supplemental devices.

* * * * *